Feb. 28, 1939.                F. MOORE                    2,148,491
                            DEOSCILLATOR
           Original Filed Dec. 1, 1933       8 Sheets-Sheet 1

Fig. 1.

INVENTOR
Frank Moore.
BY
ATTORNEYS

Feb. 28, 1939.   F. MOORE   2,148,491
DEOSCILLATOR
Original Filed Dec. 1, 1933    8 Sheets-Sheet 2

INVENTOR
Frank Moore,
BY Moses & Nolte
ATTORNEYS

Feb. 28, 1939.   F. MOORE   2,148,491
DEOSCILLATOR
Original Filed Dec. 1, 1933   8 Sheets-Sheet 4

INVENTOR
Frank Moore.
BY Moses & Nolte
ATTORNEYS

Feb. 28, 1939.　　　　F. MOORE　　　　2,148,491
DEOSCILLATOR
Original Filed Dec. 1, 1933　　8 Sheets-Sheet 5

INVENTOR
Frank Moore.
BY Moses & Nolte
ATTORNEYS

Feb. 28, 1939.  F. MOORE  2,148,491
DEOSCILLATOR
Original Filed Dec. 1, 1933    8 Sheets-Sheet 7

Fig. 10.

INVENTOR
Frank Moore.
BY Moses & Nolte
ATTORNEYS

Feb. 28, 1939.   F. MOORE   2,148,491
DEOSCILLATOR
Original Filed Dec. 1, 1933   8 Sheets-Sheet 8

INVENTOR
Frank Moore.
BY Moses & Nolte
ATTORNEYS

Patented Feb. 28, 1939

2,148,491

UNITED STATES PATENT OFFICE 2,148,491

DEOSCILLATOR

Frank Moore, Foxboro, Mass., assignor to The Foxboro Company, Foxboro, Mass., a corporation of Massachusetts Application December 1, 1933, Serial No. 700,547
Renewed June 3, 1935

8 Claims. (Cl. 236—68)

This invention relates to a system of apparatus for controlling and regulating the temperature of a furnace or oven or any other heating or cooling device, and in general for procuring automatic regulation in a system to maintain substantially constant an electrical, thermal, chemical or physical condition.

In particular this invention is applicable to the regulation of a condition that is sluggishly responsive to the agent tending to produce the condition. For example, in controlling the temperature of a furnace the common practice is to increase the heat supply when the temperature of the work zone is below normal and to reduce the heat supply when the temperature of the work zone is above normal. The temperature is ordinarily determined in a zone or location other than that wherein the heat is applied, by means of automatic apparatus that comprises a temperature responsive element, such as a thermocouple or a resistance thermometer. The temperature varies over a wider range in the zone where heat is applied than in the zone where the measuring element is located. Insensitiveness of the measuring element to respond to small changes in the latter temperature zone results, therefore, in magnified variations in the temperature of the heating zone. The temperature lag between the heating zone and the working zone serves further to interfere with the maintenance of uniform conditions. If when the working zone has been heated to a little above a desired temperature the source of energy supply is cut off, the energy stored in the heating zone will still continue to raise the temperature in the working zone. On the other hand, if the supplying of heat to the heating zone is resumed when the temperature in the working zone has dropped to a little below a desired temperature, there will nevertheless follow an interval during which the temperature in the working zone will continue to drop.

In the past considerable effort has been made to narrow the limits of temperature variation in the working zones by different methods. One method has been to control the temperature in the heating zone, but since the temperature in the working zone depends upon the thermal condition and capacity of the working zone the temperature has been found to vary with conditions of use.

Another method has been to attempt to control the temperature of the working zone by controlling the temperature difference between the heating and working zones, but since a difference of temperature can define a temperature only under a fixed group of conditions this method is undesirable.

Both of the above methods utilize what is known as "two-point" control, that is, two degrees of intensity of heat application. Other systems of "multi-point" control and "proportional" or "functional" control apply a number of fixed degrees of intensity of heat or a smooth variation of intensity of heat in proportion to the departure of the working zone temperature from the normal temperature. The systems utilizing the more complicated control apparatus require multiple position valves when used with fuel fired furnaces and wasteful resistors when used with electric furnaces. Because of the large initial cost and the wasteful operation of the more complicated systems, the relatively simple "two-point" control is considered good engineering practice in spite of the relatively poor regulation secured.

By the present invention, however, the merits of the two systems are combined in such a way that the economy and simplicity of the "two-point" control system with the close regulation of the "proportional rate" or "multiple point" system is obtained. In fact, the present invention may be advantageously applied to any "two-point" control system already installed without necessitating alterations of apparatus or furnace.

To this end it is a characteristic feature of the present invention that an auxiliary device is combined with the usual "two-point" regulating device controlled from the working zone, which auxiliary device is responsive to the same means whereby the supply of energy to the heating zone is initiated and discontinued. The auxiliary device is adapted when the supply of energy is initiated to facilitate the interruption of the supply of energy and by acting in conjunction with the regulator located in the working zone to cause the supply of energy to be discontinued earlier than it would be by the working zone regulator if the latter were unaided. The auxiliary device, on the other hand, is influenced upon the discontinuance of the supply of energy to the heating zone to aid the working zone regulator in effecting a resumption of energy supply and thus to cause the resumption of energy supply to be effected more promptly than it would be if the auxiliary device were not present.

In the preferred embodiment of the invention, the auxiliary device is of such construction that its effect, in tending to cause either the resumption or the discontinuance of energy supply, will increase with lapse of time. The effect of the device in tending to restore or interrupt the supply of energy as the case may be, will thus be the greater the longer the supply has been discontinued or resumed, respectively.

As a result of the introduction of the auxiliary device referred to, the periods of supply and interruption are both of less duration than formerly and the departures from normal temperature of the working zone are substantially reduced in magnitude.

This mode of operation is attained by apparatus of the kind illustratively disclosed herein.

In the drawings forming part of this specification.

Figure 1:
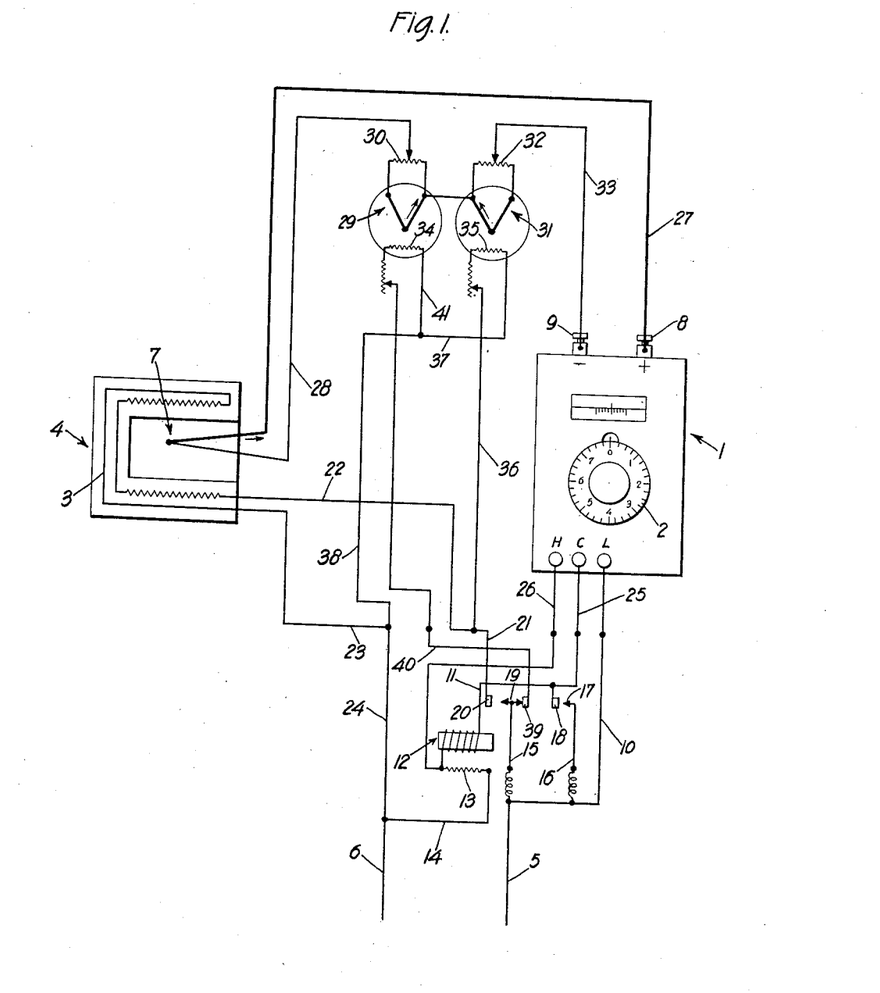
Figure 1 is a diagrammatic view of apparatus embodying features of the invention.

In the disclosure of Figure 1, a regulating control device 1 of well known construction is provided. This device may be of the millivoltmeter or the potentiometer class and comprises a galvanometer needle which is adapted to be deflected in response to conditions in the furnace work chamber. The control device comprises a dial 2 which is adapted to be set to cause the current supply of the electric furnace to be switched off and on with reference to a selected temperature. The control device is equipped with three contacts designated H, C and L, respectively. The heating element 3 in electric heater 4 is energized by current supplied through line conductors 5 and 6. A thermo-couple 7 is located in the working chamber of the electric heater 4 and is connected to binding posts 8 and 9 of the control device. The current generated by the thermo-couple 7 causes the needle of the galvanometer to be deflected. When the current generated by the thermo-couple 7 falls below a value corresponding to the temperature for which the dial 2 is set, the deflection of the needle causes contacts C and L to be connected for a short time interval. This closes a circuit through conductors 5 and 10, contacts L and C, conductor 11, the winding of electro-magnet 12, resistor 13, conductor 14 and line conductor 6. This energizes the relay 12 and causes members 15 and 16 carried by the armature of the relay to be drawn to the left. Movement of the member 16 toward the left carries contact 17 into engagement with contact 18 and thereby completes the "holding" circuit of the relay 12, which is independent of the contacts C and L. Movement of the member 15 toward the left carries contact 19 into engagement with contact 20 and thereby completes a circuit through the conductors 21 and 22, heating element 3, and conductors 23 and 24 back to line conductor 6. As the heat in the working chamber is increased, the current generated by the thermo-couple 7 is increased and eventually the current is built up to a point at which the deflection of the galvanometer needle causes the contacts C and H to be connected momentarily. These contacts are in shunt to the winding of electro-magnet 12, so that, when connected, they short-circuit the same, and cause the armature carried members 15 and 16 to move toward the right and restore the circuits to the condition illustrated in Figure 1.

Thus far, the structure of Figure 1 has been described without reference to the novel auxiliary control mechanism. The auxiliary regulating device is responsive to the throwing over of the armature carried switch members 15 and 16, and is interposed in the galvanometer circuit which includes thermo-couple 7 and binding posts 8 and 9. The tendency of this auxiliary device is to accentuate and accelerate the change which would normally be produced in the galvanometer circuit by the change of furnace conditions resulting from the making and breaking of the circuit of heater element 3.

One element of the thermo-couple 7 is connected by a conductor 27 with binding post 8. The other element is connected by a conductor 28 with a regulating thermo-couple 29 through an adjustable, potentiometer connected resistor 30. The thermo-couple 29 is connected to another regulating thermo-couple 31 which through an adjustable resistor 32, similar to the resistor 30, is connected through conductor 33 to binding post 9.

Thermally associated with the regulating thermo-couples 29 and 31 are heating elements 34 and 35 which are adapted to be connected separately and alternatively to the power supply 5, 6, according to the position of switch members 15 and 16.

When the circuit of the heater element 3 is closed by engagement of contacts 19 and 20 the circuit is also closed through heater element 35 of thermo-couple 31. The current passes from line conductor 5 through conductor 15, contacts 19 and 20, conductor 21, conductor 36, heater element 35 and conductors 37, 38 and 24 back to line conductor 6. This causes the thermo-couple 31 to generate a current which reinforces the current generated by thermo-couple 7 and which, therefore, tends to expedite the production of a galvanometer condition suitable to discontinue the supplying of power to the heating element 3.

The construction of the thermo-couple 31 and its heating element 35, as will be explained more in detail hereinafter, is preferably such that the current generated by the thermo-couple increases with the length of time that the relay remains energized. As a result of this, the tendency of the thermo-couple 31 to bring about a disconnection of the power supply increases with the lapse of time. This feature is important in the carrying out of my invention.

When the supply of power to the heating element 3 is discontinued by the switching over of contact member 19 from contact 20 to contact 39, a circuit is completed through the heater element 34 of thermo-couple 29. The current flows from line conductor 5 through conductors 15, contacts 19 and 39, conductor 40, heater element 34 and conductors 41, 38 and 24 back to line conductor 6. When heater element 34 is energized, element 35 is de-energized, and, due to its construction hereinafter more particularly described, cools rapidly to room temperature. The current generated by the thermo-couple 31, therefore, quickly falls to zero. The current of the other thermo-couple 29, on the other hand, rapidly builds up in the reverse direction in the circuit of the galvanometer. It thus augments the effect on the galvanometer due to the diminution of the current of thermo-couple 7 caused by the cooling of the work chamber. The apparatus thus tends to expedite the production of conditions at the galvanometer, which cause current to be again supplied to the heater element 3 of the furnace.

It will thus be seen that, as a result of the incorporation of the auxiliary device described, the periods of heating and cooling will be of shorter duration than heretofore. The departures from normal temperature are reduced as a consequence of this changed mode of operation with the result that more uniform working conditions are realized.

Figure 2:
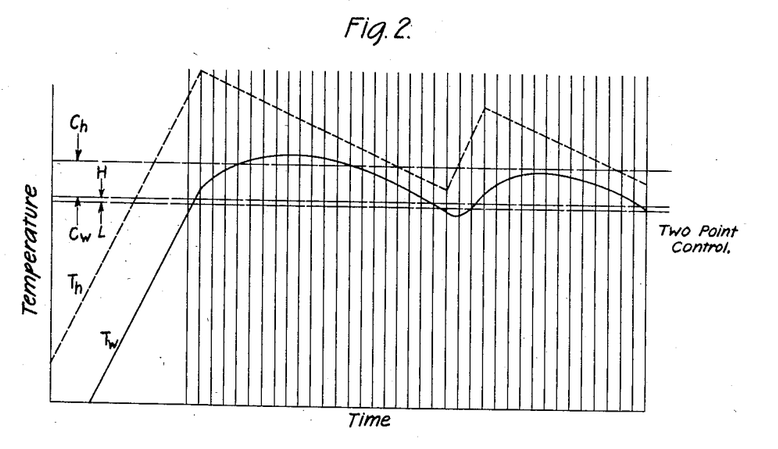
Figure 2 is a graph of the temperature-time relation in a furnace with typical lag to show the mechanics of the regulatory feature.

In Figure 2 the regulation attained by the usual "two-point" control is shown. It is assumed in both Figures 2 and 3 that heat energy is transferred from the heating zone to the work chamber. $C_h$ represents the steady control temperature in the heating zone to secure temperature $C_w$ in the work chamber. The heating rate has been assumed to be more rapid than the cooling rate. The curve $T_h$ indicates the temperature in the heating zone and the curve $T_w$ indicates the corresponding temperature in the work zone. It will be observed that the departures from normal are quite substantial and that the periods of heat application and of interruption are of long duration.

Figure 3:
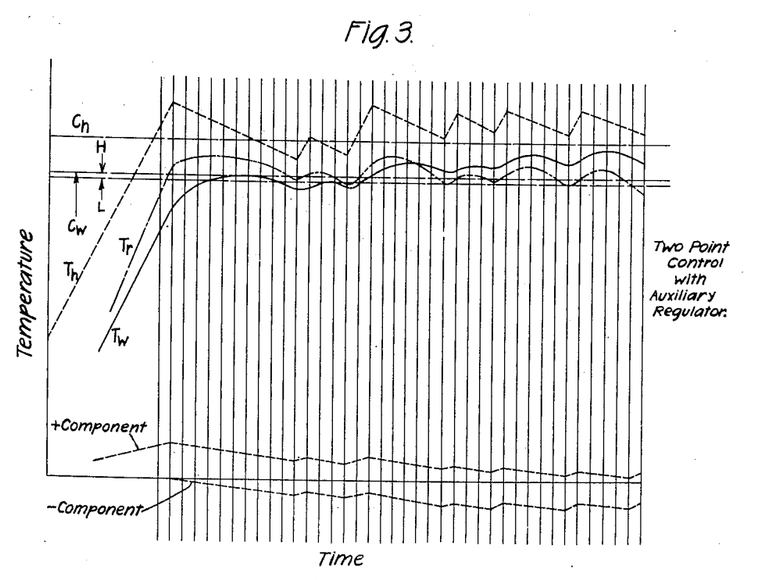
Figure 3 is a similar graph showing the temperature and time relation in the same furnace equipped with the regulating apparatus of the present invention.

In Figure 3 the control obtained on the same furnace by the use of the apparatus of Figure 1 is illustrated. $T_r$ is a curve of the total E. M. F. caused by the furnace thermo-couple 7 and the regulatory thermo-couples 29 and 31. At the foot of the plot are shown the (+) and (−) galvanometer components supplied by the thermo-couples 29 and 31. On the diagram the heating rate of the (+) component is shown as different from that of the (−) component. Adjustment of these regulatory components to proper values will make the mean temperature of the work chamber the same as that obtained in Figure 2.

A comparison of Figure 3 with Figure 2 shows at once the greater frequency of the control operation and the closer control obtainable by the method of the present invention.

It may be here noted with reference to the system illustrated in Figure 1 that the regulated rheostats 34 and 35 and the potentiometrically connected resistances 30 and 33 will be adjusted to provide the most suitable values for the galvanometer current component supplied by the thermo-couples 29 and 31. Moreover, it should be noted that in certain control apparatus well known in the art the addition of a relay such as 12 will not be required for the reason that such control apparatus includes an automatic switching mechanism which may be employed to perform a function equivalent to that of the relay 12 in the present embodiment. It will be understood that under certain conditions the system of the present invention may be operated with one of the thermo-couples 29 or 31 omitted.

It will be observed that in the system of Figure 1 the heaters 34 and 35 of the auxiliary thermo-couples 31 and 29 are independent of the furnace itself. Under certain conditions, however, I may substitute for these heaters the heat energy variations of the furnace itself. For example, thermo-couple 31 may have its junction placed in close proximity to the heater element 3 of the furnace and the thermo-couple 29 may have its junction placed at a point located between that of thermo-couple 31 and that of thermo-couple 7. With proper adjustments of the potentiometrically connected resistances the two thermo-couples provide a resultant electro-motive force which varies in magnitude with the time that the heater element 3 is energized. This electro-motive force is substantially in phase with the energization of the heater 3 and thus leads in phase the temperature variations of the working chamber. With such arrangement, therefore, the auxiliary thermo-couples will act, as in Figure 1, to cause the supply of energy to heating element 3 to be discontinued or resumed, as the case may be, earlier than it would be by the thermo-couple 7 if the latter were unaided.

It may here be noted that although the present invention is particularly applicable to the control of a condition when there is a relatively slow transfer of energy from the agent for varying the condition of the locus to the locus itself or to the combined measuring or controlling device, the method of the present invention may also be used with great success under conditions where the locus itself is changing temperature rapidly, but the combined measuring and controlling device is relatively slow to respond.

Figure 4:
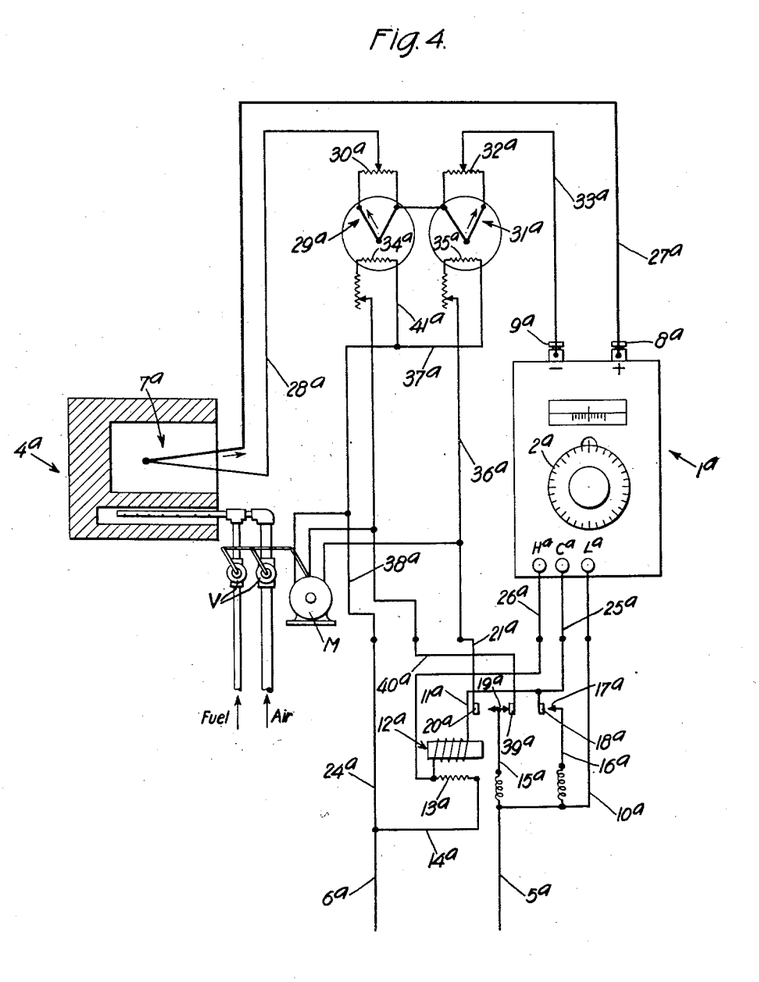
Figure 4 is a view similar to Figure 1 illustrating substantially the same control and regulating means applied to a fuel furnace equipped with motor operated valves.

In Figure 4 the invention is shown as applied to a fuel operated furnace. A fuel valve V is operated by a motor M energized through a relay 12a. With the exception of the substitution of fuel supply equipment and operating means, for the electrical heating element of Figure 1, this mechanism may be a duplicate of the mechanism illustrated and described in connection with Figure 1. For this reason, no separate description is deemed necessary and the corresponding parts have been numbered with corresponding reference numerals, each having the subscript $a$ applied.

Figures 5, 6:
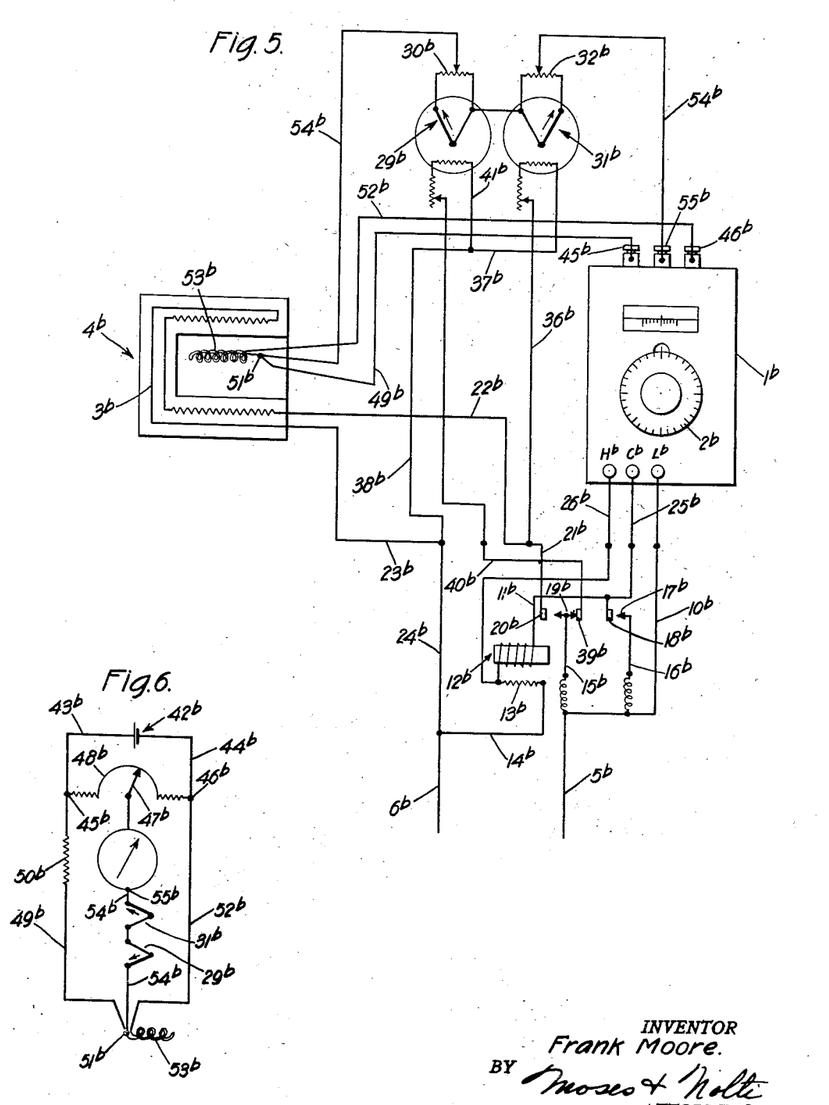
Figure 5 is a view similar to Figure 1 illustrating the carrying out of my invention by the employment of a resistance thermometer in place of the thermo-couple of Figure 1.
Figure 6 is a simplified electrical diagram of the regulating means illustrated in Figure 5.

In Figures 5 and 6 the invention is shown as applied to a furnace wherein a resistance thermometer is used to control the temperature. In this construction the circuits and apparatus are generally the same as in Figure 1. Figure 6 is a simplified electrical diagram of the galvanometer circuit arrangement. A battery 42b has its opposite poles connected through conductors 43b and 44b to terminals 45b and 46b, respectively, of the control device 1b. The control device is of the slide-wire resistance type and comprises a contact arm 47b and a resistance 48b which bridges the terminals 45b and 46b. One conductor 49b containing a fixed resistance 50b runs to a terminal 51b from terminal 45b. Another conductor 52b runs from terminal 46b through the resistor element 53b of the thermometer to the terminal 51b. From the terminal 51b a third conductor 54b is connected through thermo-couples 29b and 31b to the center terminal 55b of the controller 1b. The remaining parts of the structure illustrated in Figures 5 and 6 are identical with the structure of Figure 1. The parts have therefore been marked with corresponding reference numerals, each followed by the subscript b.

In the operation of this form of embodiment of my invention the galvanometer current changes with the temperature of resistance 53b. The thermo-couples 29b and 31b introduce current components into the galvanometer circuit, which are of such direction and magnitude as will cause the supply of energy to the heating element 3 to be discontinued earlier or to be commenced earlier, as the case may be, than it would be by the resistance 53b if the latter were unaided.

Figures 7, 8:
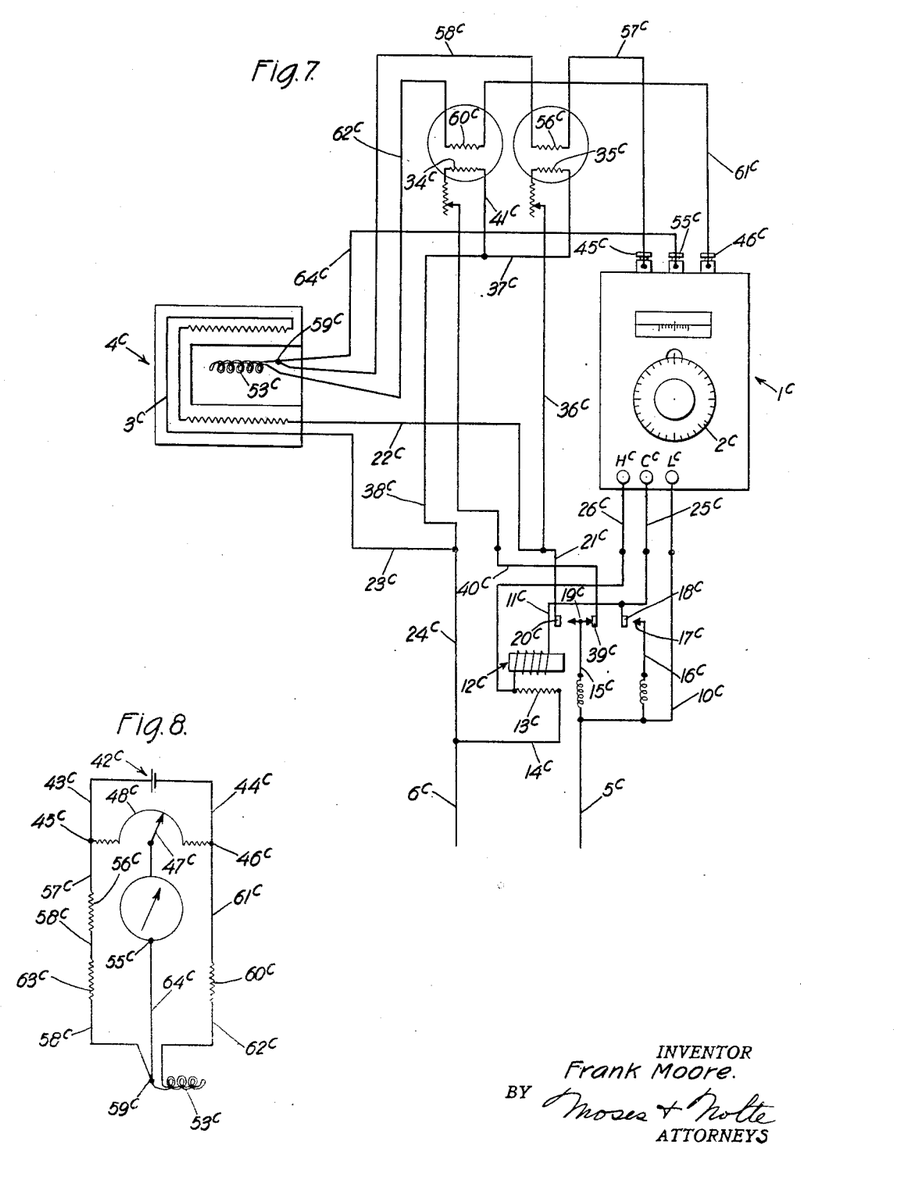
Figure 7 is a view illustrating the resistance thermometer type of apparatus with variable resistors substituted for the auxiliary thermo-couples of Figure 5.
Figure 8 is a simplified electrical diagram of the regulating means of Figure 7.

In Figures 7 and 8, the same general class of control apparatus is employed as in Figures 5 and 6, but in the auxiliary regulating device variable resistances having high temperature coefficients are employed. A battery 42c has its opposite poles connected through conductors 43c and 44c to terminals 45c and 46c of the control device 1c. The terminals 45c and 46c are connected through a resistance 48c along which contact arm 47c may be adjusted to control the temperature for which the device is set. The contact 45c is connected through a variable resistance 56c having a high temperature resistance characteristic and conductors 57c and 58c, to a terminal 59c. Resistance 63c is interposed in the conductor 58c. The terminal 46c is connected through a variable resistance 60c having a high temperature resistance coefficient, conductors 61c and 62c through the resistance element 53c of the thermometer to the terminal 59c. The conductor 64c connects the terminal 59c with the terminal 55c of the control device. The remaining parts are the same as those illustrated in Figures 5 and 6 and need not be described in detail. The corresponding reference numerals have been applied to corresponding parts with the subscript c added after each numeral.

In the operation of the form of embodiment above described, the connections are such that one of the auxiliary resistances 60c or 56c aids the resistance 53c in its effect on the galvanometer circuit so as to bring about an earlier resumption of the energy supply to the heating element 3c than would be the case if the resistance 53c were acting alone. The other auxiliary resistance serves similarly to bring about an earlier discontinuance of the energy supply.

Figure 9:
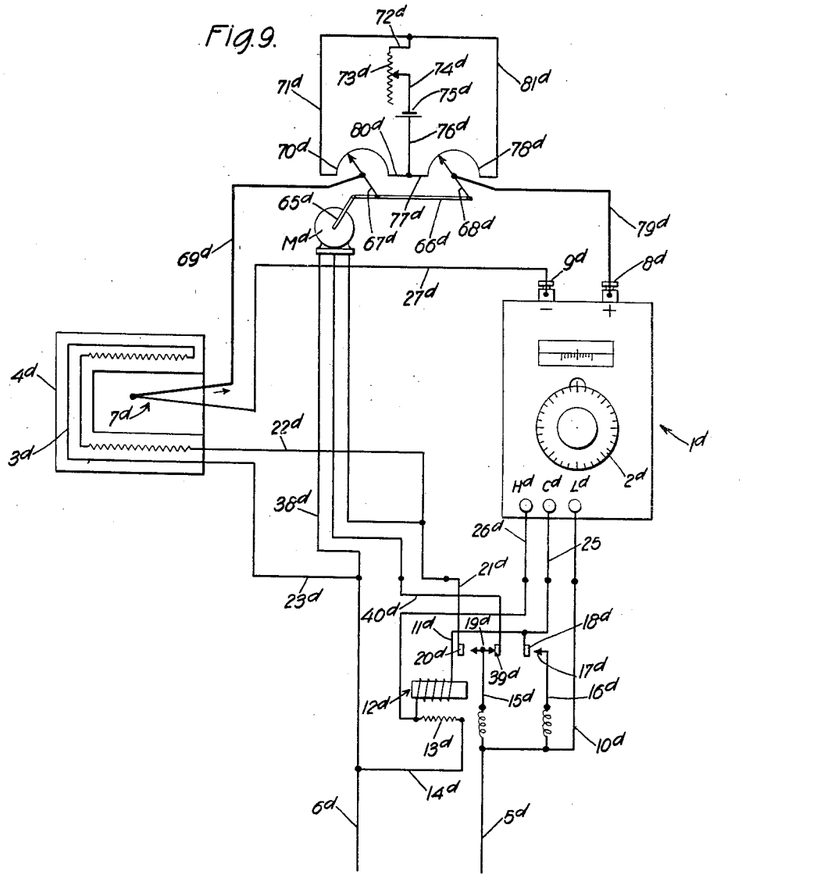
Figure 9 is a further modified embodiment of the invention wherein a battery is adapted to be included in the control circuit so as to selectively aid and oppose the current of the main control circuit.

In Figure 9 a method is shown of using an auxiliary battery as a source of electro-motive force which varies the induced electro-motive force in the galvanometer circuit when moved by a reversing motor in the control circuit. The apparatus is generally similar to that of Figure 1 and corresponding parts are accordingly numbered with the same reference numerals having the subscript d added to each numeral. Engagement of contact 19d with contact 39d causes the control motor Md to be actuated to throw the arm 65d toward the right, while engagement of the contact 19d with contact 20d energizes the motor to cause the arm 65d to be thrown toward the left. When the arm 65d is thrown toward the right as illustrated in Figure 9 the heating current is off and the auxiliary device is controlled to accentuate the waning of the current generated by the thermo-couple 7d. This control is effected through a link 66d which is connected to arm 65d and which is non-conductively connected to contact members 67d and 68d. The current generated by the thermo-couple 7d passes along conductor 69d, thence through contact member 67d to a resistance element 70d. A desired portion of the current then passes through conductor 71d, conductor 72d, variable resistance 73d, conductors 74d, battery 75d, conductor 76d, conductor 77d, resistance 78d, contact member 68d, and conductor 79d to terminal 8d of the control device 1d, thence through the galvanometer and back through terminal 9d and conductor 72d to the thermo-couple 7d. The generated current in following the above described path is required to pass through the battery 75d in the direction counter to the electromotive force generated by the battery. The battery thus serves to reduce the waning current generated by thermo-couple 7d so that an earlier re-application of heat is brought about.

When the heating element 3d is energized the motor circuit through contacts 19d and 20d causes the arm 65d to be swung toward the left and to swing contact members 67d and 68d clockwise toward the right hand extremities of resistances 70d and 78d. The heating of the thermo-couple 7d causes the current generated by the thermo-couple to be increased. This current passes through conductor 69d and contact 67d to resistance 70d. The contact 67d being near the right hand extremity of the resistance 70d the major portion of the current passes through conductor 80d, thence through conductor 76d, battery 75d, conductor 74d, variable resistance 73d, conductors 72d and 81d, resistance 78d, contact member 68d and conductor 79d to controller terminal 8d. The circuit is completed through conductor 27d as before. In following this path the current is caused to pass through the battery 75d in the same direction in which current generated by the battery tends to flow. The battery therefore tends to reinforce the current from thermo-couple 7d, so that an earlier discontinuance of the energy supply is brought about.

Figure 10:
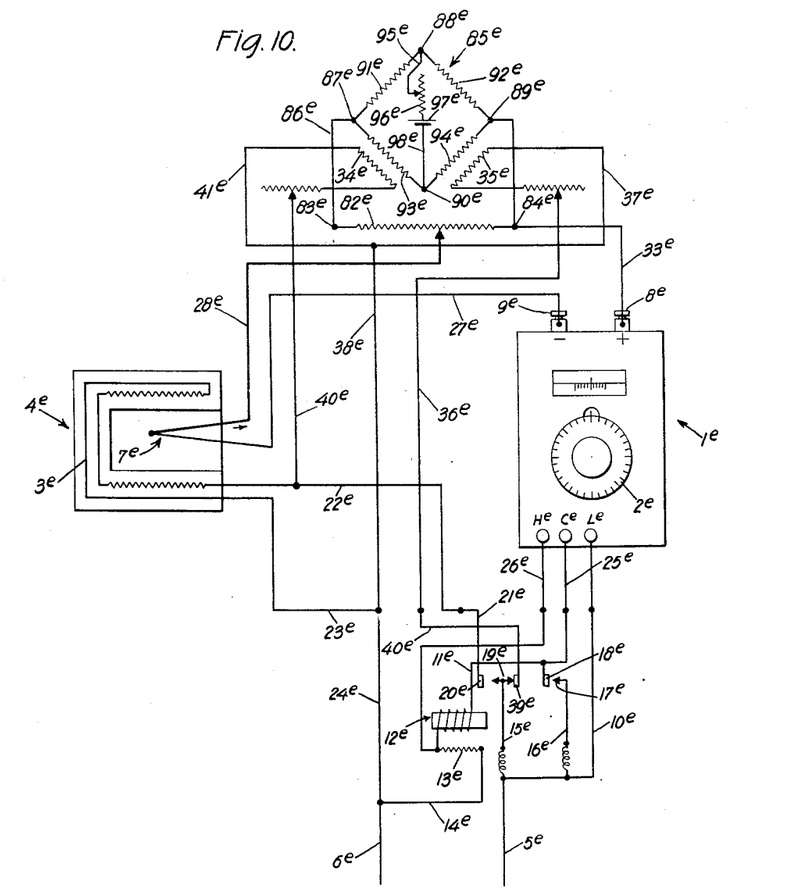
Figure 10 illustrates the employment of an auxiliary battery as a source of current in an auxiliary Wheatstone bridge circuit, the resistances of two branches of which are variable with temperatures from the regulatory heaters.

Figure 10 illustrates a method of using a battery as a source of auxiliary electro-motive force in Wheatstone bridge circuit connections. In this circuit the resistances of two arms of the Wheatstone bridge are variable with temperature and are controlled from the regulatory heaters. This figure is generally similar to the disclosure of Figure 1 and corresponding reference numerals have accordingly been applied to corresponding parts with the subscript e added. The conductors 36e and 40e are connected respectively to heaters 35e and 34e. These heaters are connected respectively through conductors 37e and 41e with a conductor 38e and thence through conductor 24e to line conductor 6e. The terminal 9e of the controller 1e is connected to thermo-couple 7e through a conductor 27e. The thermo-couple 7e is connected through a conductor 28e with a variable resistance 82e. The resistance 82e extends between terminals 83e and 84e. The terminal 84e is connected through conductor 33e to terminal 8e of the controller 1e.

A portion of the current of thermo-couple 7e travels from conductor 28e directly through variable resistance 82e to terminal 84e and thence to the controller. Depending upon the adjustment of the variable resistance 82e, however, a desired proportion of the generated current is diverted through terminal 83e to the Wheatstone bridge generally designated 85e. This portion of the current travels from 83e through a conductor 86e to a terminal 87e of the Wheatstone bridge 85e. The Wheatstone bridge comprises terminals 87e, 88e, 89e and 90e and four arms including respectively the resistances 91e, 92e, 93e and 94e. The two latter resistances are variable resistances having high temperature resistance coefficients. These resistances are thermally associated with the heaters 34e and 35e respectively. The terminals 88e and 90e are bridged by a conductor 95e, variable resistance 96e, a battery 97e and a conductor 98e.

When the furnace is being heated the heater 34e is energized and the heater 35e is deenergized. In these circumstances, the resistance of resistor 93e is increased and the resistance of resistor 94e is normal or returning toward normal. An increasing portion of the current reaching terminal 87e accordingly takes the path along resistor 91e to terminal 88e. The result is that the current of battery 97e aids the effect on the galvanometer of the current from thermo-couple 7e. As a consequence there is brought about an earlier discontinuance of the supply of current to the heater 3e.

When the furnace heater is shut off, however, as illustrated in Figure 10 the heater 34e is deenergized and the heater 35e is energized. The resistance of resistor 93e now drops toward normal and the resistance of resistor 94e is increased. At the same time the current from thermo-couple 7e is waning. This current from thermo-couple 7e which reached terminal 87e is not divided in the same proportion as before but an increasing part of it passes along the cooling resistor 93e. The resistance of resistor 94e is increased, however, and hence a substantial portion of the current reaching 90e is caused to pass across the bridge to 88e and thence to 89e, this portion of the current being directly opposed by the electromotive force of the battery 97e. Thus the waning of the current of the thermo-couple 7e is accentuated by the battery and an earlier resumption of heating is brought about.

Figure 11:
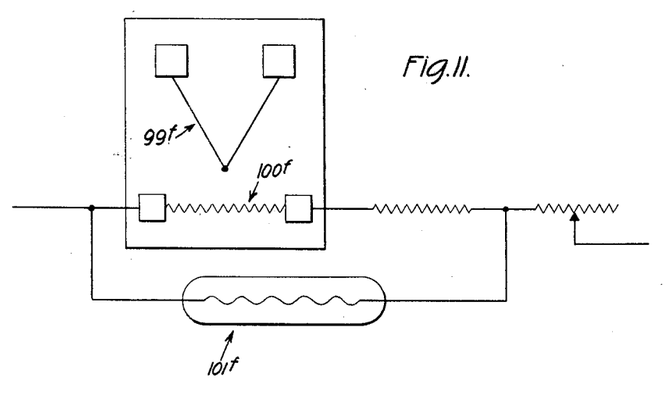
Figure 11 illustrates one means whereby the energizing heating current of the auxiliary control device is made to increase with time.

As has already been mentioned, it is desirable that the auxiliary regulating current introduced be caused to increase with time. In Figure 11 disclosure is made of an arrangement whereby the heater curent is caused to increase with time. The thermo-couple 99f has a low thermal capacity and the heater 100f increases in temperature as the current through it increases. The heater is shunted by a ballast lamp 101f which, as is well known to those versed in the art, increases in resistance as time elapses. The net result is to shunt an increasing proportion of the current through the heater 100f as time elapses, with the result that the current of the thermo-couple will increase correspondingly.

Figure 12:
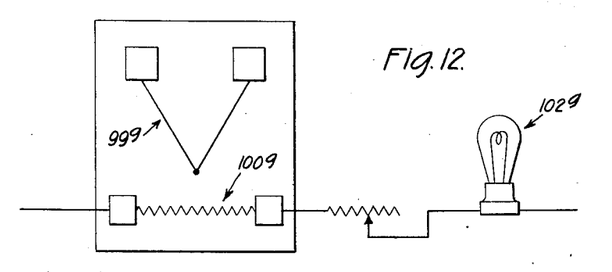
Figure 12 shows another method of accomplishing the same result.

In Figure 12 a carbon ballast lamp 102g is placed in series with the heater 100g. The filament of this lamp has a high negative temperature resistance coefficient. The lamp is operated at low efficiency, so that the temperature of this filament rises slowly and the resistance decreases slowly. An increasing amount of current is thus caused to pass through heater 100g with lapse of time.

Figure 13:
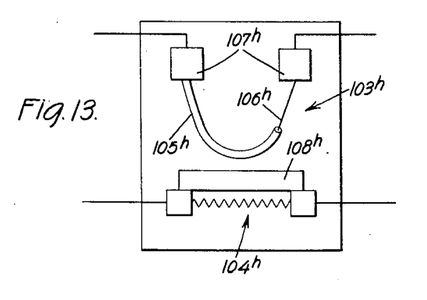
Figure 13 shows a further construction of a regulator thermo-couple and a thermally associated regulator heater.
Figure 14:
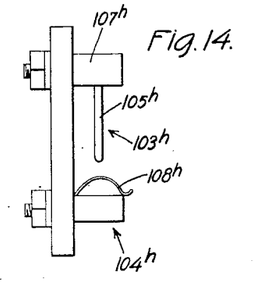
Figure 14 is a side elevation of the structure illustrated in Figure 13.

In Figures 13 and 14 disclosure is made of a thermo-couple 103h constructed to respond somewhat sluggishly to a changed condition of the heater 104h. One element 105h of the thermo-couple is made massive with respect to the other element 106h, the element 105h being the element of better heat conductivity. Massive supporting posts 107h of good heat radiating properties tend to promote rapid cooling after the supply of energy has been cut off from the heater 104h. The heater 104h is of low thermal capacity. A barrier 108h of low heat capacity material and mass is interposed between the heater 104h and the thermo-couple 103h to bring about a relatively slow heating of the thermo-couple junction. This latter effect is augmented by the construction of the thermo-couple as shown, wherein the upward bent element 105h furnishes a path for heat to reach the thermo-couple junction at a rate increasing with the time heater 104h is energized. A sluggish response of the thermo-couple to the heater is thus obtained.

I have described what I believe to be the best embodiments of my invention. I do not wish, however, to be confined to the embodiments shown, but what I desire to cover by Letters Patent is set forth in the appended claims.

I claim:

1. In a temperature controlling and regulating system, the combination of a control means under control of a main thermo-couple and adapted to apply heat energy from time to time to the thermal zone of said thermo-couple, a regulator means controlling a separate source of current, electrically associated with said thermo-couple and under control of said control means, tending to introduce a current component into said thermo-couple circuit to offset thermal conditions adverse to stabilization in said thermal zone, comprising a pair of opposed thermo-couples connected to one another and each connected in a completely closed local circuit comprising a resistance, and contacts forming elements of the circuit of the main thermo-couple and adjustable along said resistances.

2. The method of maintaining the temperature of a condition substantially at a control point which comprises, measuring the temperature of the condition, controlling the supply of heat to the condition in accordance with said measurement to cause the temperature of the condition always to cycle across said control point at a relatively high frequency by supplying heat to the condition alternately in a first predetermined amount always materially greater than the amount needed to maintain the condition at said control point and then in a second predetermined amount always less than the amount needed to maintain the condition at said control point, introducing into the control system an auxiliary force independent of the temperature of said condition to cause said measured value to effectively increase when the heat supply is large and to effectively decrease when the heat supply is small, and accelerating the rate of change of said auxiliary force to increase the frequency of the temperature cycle and decrease its amplitude.

3. Temperature control apparatus, comprising, in combination, a temperature sensitive means, a heating means adapted to supply heat to the thermal zone of said temperature sensitive means alternately in a first predetermined amount always materially greater than the amount needed to maintain the condition at a control point, and then in a second amount always materially less than the amount necessary to maintain the condition at said control point to cause its temperature always to cycle across said control point, control means controlling said heating means, means under the control of said control means controlling the application of auxiliary power to said temperature sensitive means for exerting an auxiliary force on said temperature sensitive means either in favor of or in opposition to the effect of said thermal zone on said temperature sensitive means to cause the heat supply to be reduced to said first predetermined amount when the temperature is below the desired value and to be increased to said second predetermined amount when the temperature is above the desired value, and means to cause the rate of change of said auxiliary force to increase rapidly with time whereby the frequency of the temperature cycle is increased and its amplitude is decreased.

4. In a temperature control apparatus for controlling the supply of heat to a process to maintain its temperature substantially at a control point, in combination, mechanism for governing the supply of heat, means responsive to the temperature for actuating said mechanism, auxiliary means acting alternately in opposition to and in favor of said temperature responsive means to cause the same to actuate said mechanism in advance of the time that it would normally actuate said mechanism, and said auxiliary means having an accelerating rate of change in its effect on said temperature responsive means.

5. In a temperature control apparatus for controlling the supply of heat to a process to maintain its temperature substantially at a control point, in combination, mechanism for governing the supply of heat, means responsive to the temperature for actuating said mechanism, auxiliary means acting alternately in opposition to and in favor of said temperature responsive means to cause the same to actuate said mechanism in advance of the time that it would normally actuate said mechanism, electrical heating means for actuating said auxiliary means, and a ballast resistance having a high positive temperature-resistance characteristic shunted across said electrical heating means to accelerate the rate of change of the heating effect of said heating means.

6. In a temperature control apparatus for controlling the supply of heat to a process to maintain its temperature substantially at a control point, in combination, mechanism for governing the supply of heat, means responsive to the temperature for actuating said mechanism, auxiliary means acting alternately in opposition to and in favor of said temperature responsive means to cause the same to actuate said mechanism in advance of the time that it would normally actuate said mechanism, electrical heating means for actuating said auxiliary means, and a ballast resistance having a high negative temperature-resistance characteristic connected in series with said heating means to accelerate the rate of change of the heating effect of said heating means.

7. In a temperature control apparatus for controlling the supply of heat to a process to maintain its temperature substantially at a control point, in combination, mechanism for governing the supply of heat, means responsive to the temperature for actuating said mechanism, auxiliary means acting alternately in opposition to and in favor of said temperature responsive means to cause the same to actuate said mechanism in advance of the time that it would normally actuate said mechanism, electrical heating means for actuating said auxiliary means, and a carbon ballast lamp operated at low efficiency connected in series with said heating means to accelerate the rate of change of the heating effect of said heating means.

8. In a temperature control apparatus for controlling the supply of heat to a process to maintain its temperature substantially at a control point, in combination, mechanism for governing the supply of heat, means responsive to the temperature for actuating said mechanism, thermocouple means for generating an auxiliary electrical force, acting alternately in opposition to and in favor of said temperature responsive means to cause the same to actuate said mechanism in advance of the time that it would normally actuate said mechanism, means for selectively heating said thermocouple means, said thermocouple means and said selective heating means having relatively low thermal capacity so as to be adapted for rapid heating and cooling, and said selective heating means being separated from said auxiliary thermocouples by a barrier of relatively low thermal capacity whereby the rate of change of the E. M. F. from said thermocouple means is accelerated.

FRANK MOORE.